United States Patent
Song et al.

(10) Patent No.: US 11,282,237 B2
(45) Date of Patent: Mar. 22, 2022

(54) IMAGE DISPLAY APPARATUS AND METHOD OF CONTROLLING THE SAME

(71) Applicant: SAMSUNG ELECTRONICS CO., LTD., Suwon-si (KR)

(72) Inventors: Won Seok Song, Suwon-si (KR); Shin Haeng Kim, Suwon-si (KR); Yoo Sun Jung, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 16/960,405

(22) PCT Filed: Jan. 4, 2019

(86) PCT No.: PCT/KR2019/000123
§ 371 (c)(1),
(2) Date: Jul. 7, 2020

(87) PCT Pub. No.: WO2019/135625
PCT Pub. Date: Jul. 11, 2019

(65) Prior Publication Data
US 2020/0334865 A1 Oct. 22, 2020

(30) Foreign Application Priority Data
Jan. 8, 2018 (KR) .................. 10-2018-0002220

(51) Int. Cl.
*G06T 9/00* (2006.01)

(52) U.S. Cl.
CPC ...................... *G06T 9/00* (2013.01)

(58) Field of Classification Search
CPC ........................................................ G06T 9/00
See application file for complete search history.

(56) References Cited

U.S. PATENT DOCUMENTS

| | | | |
|---|---|---|---|
| 2003/0182341 A1 | 9/2003 | Snyder | |
| 2013/0129239 A1* | 5/2013 | Fukuhara | H04N 19/85 382/233 |
| 2014/0044167 A1* | 2/2014 | Jung | H04N 19/147 375/240.12 |

FOREIGN PATENT DOCUMENTS

| | | |
|---|---|---|
| JP | 2009-282977 | 12/2009 |
| JP | 2009-282977 A | 12/2009 |

(Continued)

OTHER PUBLICATIONS

International Search Report dated Apr. 19, 2019 from International Application No. PCT/KR2019/000123, 3 pages.

(Continued)

*Primary Examiner* — Shivang I Patel
(74) *Attorney, Agent, or Firm* — Staas & Halsey, LLP

(57) ABSTRACT

An object of the present disclosure is to restore a quantization error of an image signal only by expanding the number of bits of a reconstructed image compared to the number of bits of an input image without expanding the number of bits in an image signal processing process. An image display apparatus may include a signal inputter configured to receive an input image signal; an image signal processor configured to perform image processing of the input image signal, to identify a type of image processing by comparing the input image signal and the processed image signal, to obtain restoration information of the processed image signal according to the identified image processing type, and to restore an error of the processed image signal by performing remapping of the processed image signal using the restoration information; and an outputter configured to output the image signal in which the error is restored.

23 Claims, 12 Drawing Sheets

(56) References Cited

FOREIGN PATENT DOCUMENTS

| | | |
|---|---|---|
| KR | 1998-026479 A | 7/1998 |
| KR | 10-2003-0067037 | 8/2003 |
| KR | 2003-0067037 A | 8/2003 |
| WO | 2011/010834 | 1/2011 |
| WO | 2011/010834 A2 | 1/2011 |

OTHER PUBLICATIONS

Korean Office Action dated Nov. 22, 2021 from Korean Application No. 10-2018-0002220.

* cited by examiner (I)   (II)

(Ⅰ)

(Ⅱ)

(Ⅲ)

IMAGE DISPLAY APPARATUS AND METHOD OF CONTROLLING THE SAME

CROSS-REFERENCE TO RELATED APPLICATIONS

This application is a U.S. National Stage Application which claims the benefit under 35 U.S.C. § 371 of International Patent Application No. PCT/KR2019/000123 filed on Jan. 4, 2019, which claims foreign priority benefit under 35 U.S.C. § 119 of Korean Patent Application No. 10-2018-0002220 filed on Jan. 8, 2018 in the Korean Intellectual Property Office, the contents of each of which are incorporated herein by reference.

TECHNICAL FIELD

The present disclosure relates to an image display apparatus, and more particularly, to image restoration of the image display apparatus.

BACKGROUND ART

Image quantization is an operation of "digitizing" a value of an image function $f(x, y)$ into a spatial coordinate system and may include allocating a range of "brightness" values appropriate to each pixel according to a signal strength. Quantization may refer to a process of changing a continuously changing function $f(x, y)$ to a discrete quantization level. In general, an image value is composed of n quantization levels composed of integer values of $0, 1, 2, \ldots, n-1$. For example, in the case of a binary image consisting simply of 0s and 1s, the value of the quantized pixel is simply 0 or 1. On the other hand, in the case of a gray scale image representing 0 as a darkest value and 255 as a brightest value, a quantization range of pixels may range from 0 to 255.

In the quantization process, an input value is divided by a quantization step, and then integerized to obtain a quantized value. Since the quantized value becomes an integer value within a range of '1/quantization step' from an original range of the input value, image loss occurs in the quantization process.

DISCLOSURE

Technical Problem

An object of the present disclosure is to restore a quantization error of an image signal only by expanding the number of bits of a reconstructed image compared to the number of bits of an input image without expanding the number of bits in an image signal processing process.

Technical Solution

An aspect of the disclosure provides an image display apparatus including: a signal inputter configured to receive an input image signal; an image signal processor configured to perform image processing of the input image signal, to identify a type of the image processing by comparing the input image signal and the processed image signal, to obtain restoration information of the processed image signal according to the identified image processing type, and to restore an error of the processed image signal by performing remapping of the processed image signal using the restoration information; and an outputter configured to output the image signal in which the error is restored.

The image signal processor may include at least one signal processing block configured to perform the image processing; and at least one signal restoration block configured to perform the restoration information extraction and the error restoration.

In the signal processing block, the number of bits of the processed image signal is not expanded. In the signal restoration block, the number of bits of the restored image signal is extended.

An extension of the number of bits of the image signal in the signal restoration block is greater than or equal to the number of bits of the output image signal of the signal restoration block than the number of bits of the image signal output from the signal processing block.

The signal restoration block may include analysis logic configured to extract the restoration information through analysis of the input image signal and the processed image signal; and restoration logic configured to restore the error in the processed image signal using the restoration information.

The image signal processor may be configured to identify the image processing type using average, variance, and standard deviation of image pixel values processed for pixels having the same value in the input image. The image processing type may include at least one of global processing, local processing, and random processing.

When the signal processing type is the global processing, the image signal processor may be configured to estimate a mapping function from a certain pixel value changed by the signal processing for each pixel of the input image signal.

When the signal processing type is the random processing, the image signal processor may be configured to estimate a mapping function from the average of changed pixel values of corresponding pixels in an image in which pixels having the same pixel value in the input image signal are processed.

When the signal processing type is the random processing, the image signal processor may be configured to divide the input image into a plurality of areas and estimate a mapping function for each of the plurality of areas.

The restoration information may include a mapping function of the input image signal.

A linear interpolation method is used to convert a many-to-one mapping generation area to one-to-one mapping.

The restoration of the error may be configured to smooth a mapping function converted to one-to-one mapping, and to generate a restored output image signal by remapping the converted mapping function with reference to the input image signal.

The error is a quantization error that occurs during a quantization process of the input image signal.

Another aspect of the disclosure provides a method of controlling an image display apparatus including: receiving an input image signal; an image processing step of performing image processing of the input image signal; an image restoration step of identifying a type of image processing by comparing the input image signal and the processed image signal, obtaining restoration information of the processed image signal according to the identified image processing type, and restoring an error of the processed image signal by performing remapping of the processed image signal using the restoration information; and an image output step of outputting the image signal in which the error is restored.

In a signal processing block, the number of bits of the processed image signal is not expanded. In a signal restoration block, the number of bits of the restored image signal is extended.

An extension of the number of bits of the image signal in a signal restoration block is greater than or equal to the number of bits of the output image signal of the signal restoration block than the number of bits of the image signal output from a signal processing block.

The image restoration step may include an image analysis step of extracting the restoration information through analysis of the input image signal and the processed image signal; and an image restoration step of restoring the error in the processed image signal using the restoration information.

The method may further include identifying the image processing type using average, variance, and standard deviation of image pixel values processed for pixels having the same value in the input image. The image processing type may include at least one of global processing, local processing, and random processing.

When the signal processing type is the global processing, estimating a mapping function from a certain pixel value changed by the signal processing for each pixel of the input image signal.

When the signal processing type is the random processing, estimating a mapping function from the average of changed pixel values of corresponding pixels in an image in which pixels having the same pixel value in the input image signal are processed.

When the signal processing type is the random processing, dividing the input image into a plurality of areas and estimate a mapping function for each of the plurality of areas.

The restoration information may include a mapping function of the input image signal.

The method may further include using a linear interpolation method to convert a many-to-one mapping generation area to one-to-one mapping.

The restoration of the error further may include smoothing a mapping function converted to one-to-one mapping; and generating a restored output image signal by remapping the converted mapping function with reference to the input image signal.

The error is a quantization error that occurs during a quantization process of the input image signal.

Advantageous Effects

According to an aspect of an embodiment, it is possible to restore a quantization error of an image signal only by expanding the number of bits of a reconstructed image compared to the number of bits of an input image without expanding the number of bits in an image signal processing process.

MODES OF THE INVENTION

Figure 1:
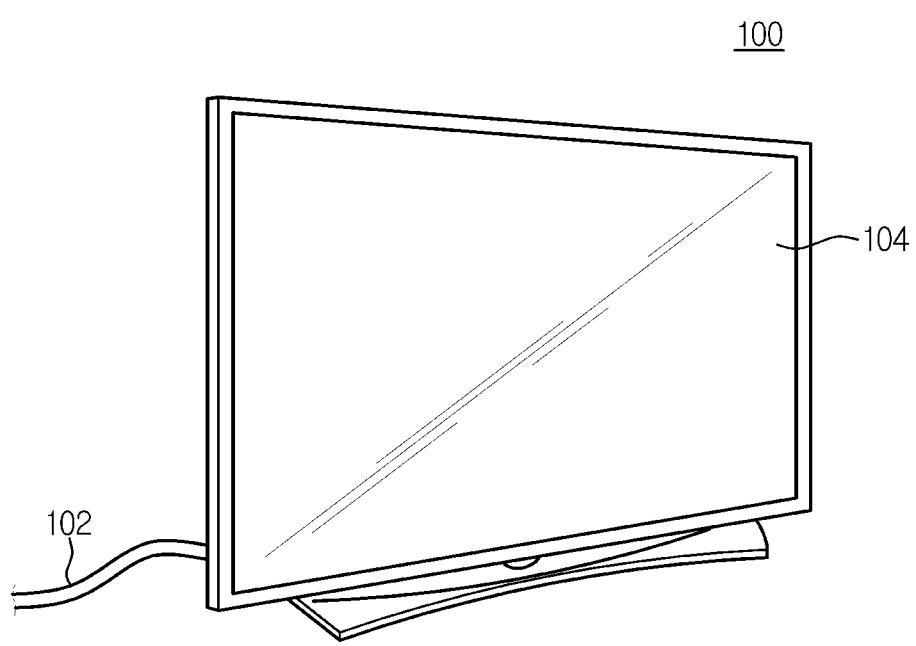
FIG. 1 is a view illustrating an image display apparatus according to an embodiment.

FIG. 1 is a view illustrating an image display apparatus according to an embodiment. In an image display apparatus 100 illustrated in FIG. 1, an input image signal received through an input cable 102 is displayed as an image through a display 104 after passing through a signal processing process inside the image display apparatus 100. The image signal may be received in a wireless manner instead of the input cable 102. The image display apparatus 100 is not limited to a television, and may be applied to all apparatuses that process image signals, such as desktop monitors, laptops, surveillance cameras, and projectors.

Figure 2:
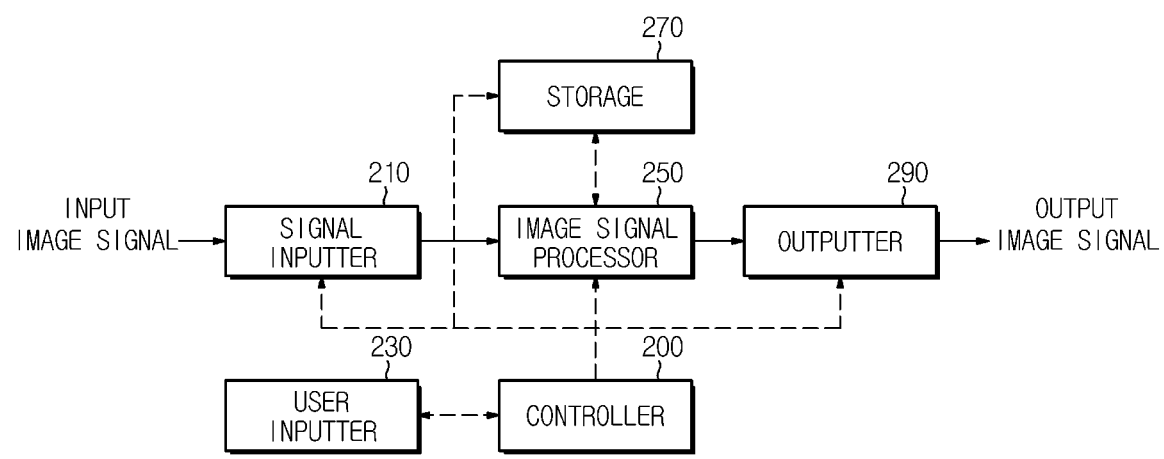
FIG. 2 is a view illustrating a control system of an image display apparatus according to an embodiment.

FIG. 2 is a view illustrating a control system of an image display apparatus according to an embodiment. Referring to FIG. 2, the input image signal is finally output as an output image signal through a signal inputter 210, an image signal processor 250, and an outputter 290. A storage 270 may be connected to the image signal processor 250. The storage 270 may store data necessary for image signal processing or data generated during image signal processing. A controller 200 may be involved in the overall control of the image display apparatus 100. For example, the controller 200 may control the overall control of the signal processing process until the input image signal is finally output. A user inputter 230 may be connected to the controller 200. The user inputter 230 may be a user interface provided in the image display apparatus 100.

The image signal input through the signal inputter 210 may be output through the outputter 290 after a series of signal processing processes in the image signal processor 250.

The outputter 290 may include the display 104 (see FIG. 1).

Figure 3:
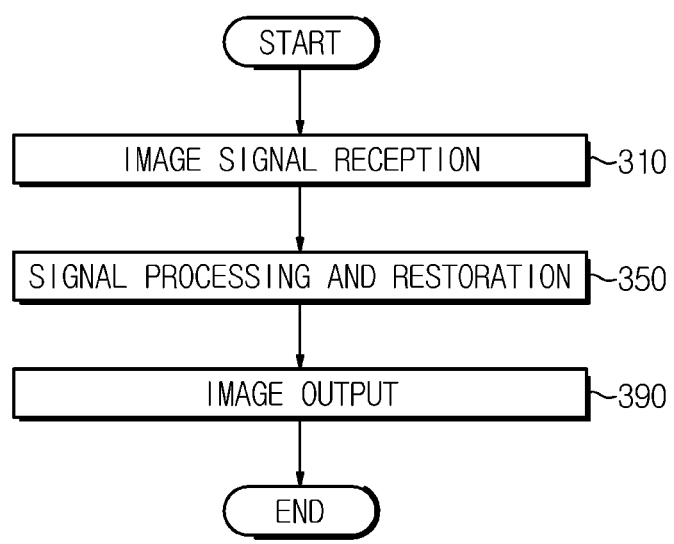
FIG. 3 is a view illustrating a method of controlling an image display apparatus according to an embodiment.

FIG. 3 is a view illustrating a method of controlling an image display apparatus according to an embodiment. A method of controlling the image display apparatus 100 illustrated in FIG. 3 may include an image signal reception 310, signal processing and restoration operation 350, and an image output 390.

The image signal reception 310 may be, as mentioned in the description of FIG. 1, to receive the image signal input through the input cable 102. The image signal reception 310 may be to receive the image signal transmitted in a wireless manner instead of the input cable 102.

The signal processing and restoration 350 may perform image processing of the input image signal, extract restoration information from the input image signal and the image processed signal, and restore quantization errors of the image processed signal using the restoration information.

The image output 390 may display the image signal, which has been signal processed and restored, through the display 104 so that a user (viewer) can view the image.

Figure 4:
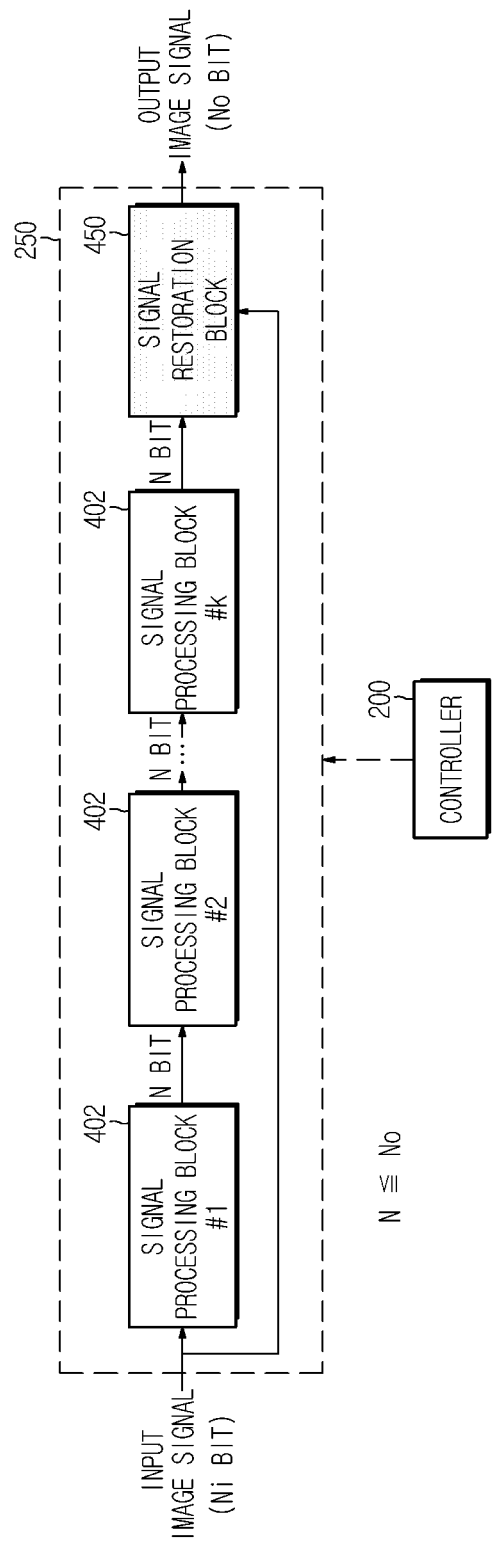
FIG. 4 is a view illustrating a configuration of an image signal processor of an image display apparatus according to an embodiment.

FIG. 4 is a view illustrating a configuration of an image signal processor of an image display apparatus according to an embodiment. The image signal processor 250 illustrated in FIG. 4 may be provided to perform the signal processing and restoration 350 described in FIG. 3 above. As illustrated in FIG. 4, the image signal processor 250 includes at least one signal processing block 402 and at least one signal restoration block 450. A plurality of the signal processing blocks 402 may be provided in the image signal processor 250.

The at least one signal processing block 402 may perform a series of signal processing on the input image signal. In the signal processing process, quantization of the input image signal may be performed to increase a signal processing speed and reduce a computation amount. Since the quantization process involves loss of the image signal, the signal restoration block 450 may restore the loss that occurred in the quantization process, that is, the quantization error.

In the image signal processor 250, for example, an N-bit image signal is handled in the signal processing process until the input image signal is input to the signal restoration block 450. The number of N bits of the image signal handled in the at least one signal processing block 402 is not necessarily dependent on the number of Ni bits of the input image signal and the number of No bits of the output image signal. When processing signals in the at least one signal processing block 402, the signal processing may be performed within a predetermined N-bit range without expanding the number of bits. The extension of the number of bits occurs only in the signal restoration block 450. If there are multiple signal restoration blocks 450, the number of bits is expanded only in the signal restoration block 450 located at a last position in the signal flow. At this time, the number of the N bits of the image signal output from the signal processing block 402 and the number of the No bits of the image signal output from the signal restoration block 450 have a relationship of 'N≤No.' That is, the number of the No bits of the image signal output from the signal restoration block 450 is greater than or equal to the number of the N bits of the image signal output from the signal processing block 402.

As such, since the at least one signal processing block 402 of the image signal processor 250 according to the embodiment does not increase the number of allocated bits, the burden of hardware and software that may be caused by the increase of the number of allocated bits may be reduced.

Figure 5:
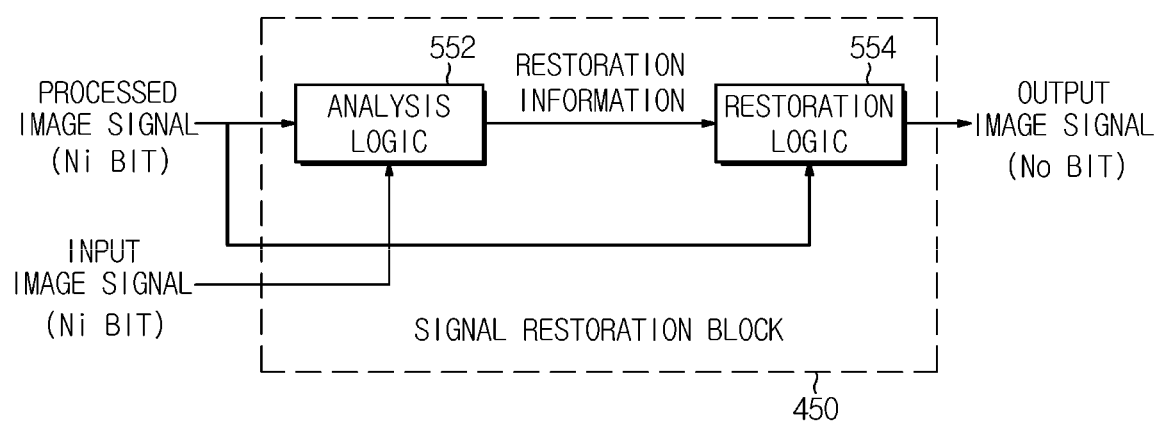
FIG. 5 is a view illustrating a signal restoration block of an image display apparatus according to an embodiment.

FIG. 5 is a view illustrating a signal restoration block of an image display apparatus according to an embodiment. As illustrated in FIG. 5, the signal restoration block 450 may include analysis logic 552 and restoration logic 554. Two image signals may be input to the analysis logic 552. A first image signal input to the analysis logic 552 may be the image signal signal-processed in the signal processing block 402 (for example, signal processing block #k in FIG. 4) located in a front end of the analysis logic 552 in the signal flow. When there are the plurality of signal processing blocks 402, the k-th signal processing block 402 may be the signal processing block 402 disposed in a final stage. A second image signal input to the analysis logic 552 may be an original input image signal that has not been processed by the image signal processor 250. The analysis logic 552 may extract the restoration information through comparison and analysis of the first image signal and the second image signal.

That is, the analysis logic 552 may compare the image signal signal-processed in the k-th signal processing block 402 of the previous stage with the original input image signal that does not undergo signal processing, and may extract a degree of change as the original input image signal undergoes k-step signal processing through a difference between the two image signals. The degree of change of the input image signal may be used as the restoration information for restoring the quantization error in the restoration logic 554 described later.

For example, the restoration information may include moments, histograms, mapping functions, etc., which can be obtained by comparing the original input image signal and a signal processing image.

The restoration logic 554 may restore the quantization errors that occur during signal processing of the at least one signal processing block 402 by referring to the restoration information extracted from the analysis logic 552. To this end, the restoration logic 554 may receive the image signal processed by the signal processing block 402 and receive the restoration information from the analysis logic 552. Since the degree of change that occurs while the original input image signal undergoes signal processing in the k-step can be known through the restoration information, the restoration logic 554 may restore the signal-processed image signal close to the original input image based on the restoration information.

To this end, the restoration logic 554 may detect many-to-one mapping generation areas from the mapping function of the restoration information, convert the many-to-one mapping generation areas to one-to-one mapping using an interpolation method, smooth the converted mapping function, and generate a restored output image signal by remapping the converted mapping function with reference to the original input image signal. The mapping function may indicate a pixel value corresponding to each pixel. The image restoration may be achieved by comparing the mapping function of the original image signal and the mapping function of the quantized image signal and performing remapping to remove the difference (quantization error). After converting the many-to-one mapping generation area to the one-to-one mapping, the converted mapping function may be smoothed. By smoothing the mapping function, it is possible to obtain a mapping function that is close to an ideal form with smooth characteristics while covering the entire signal processing process. The smoothing process is optional and may be omitted if necessary.

An image restoration method of the image display apparatus according to the embodiment will be described with reference to FIGS. 6 to 11.

Figure 6:
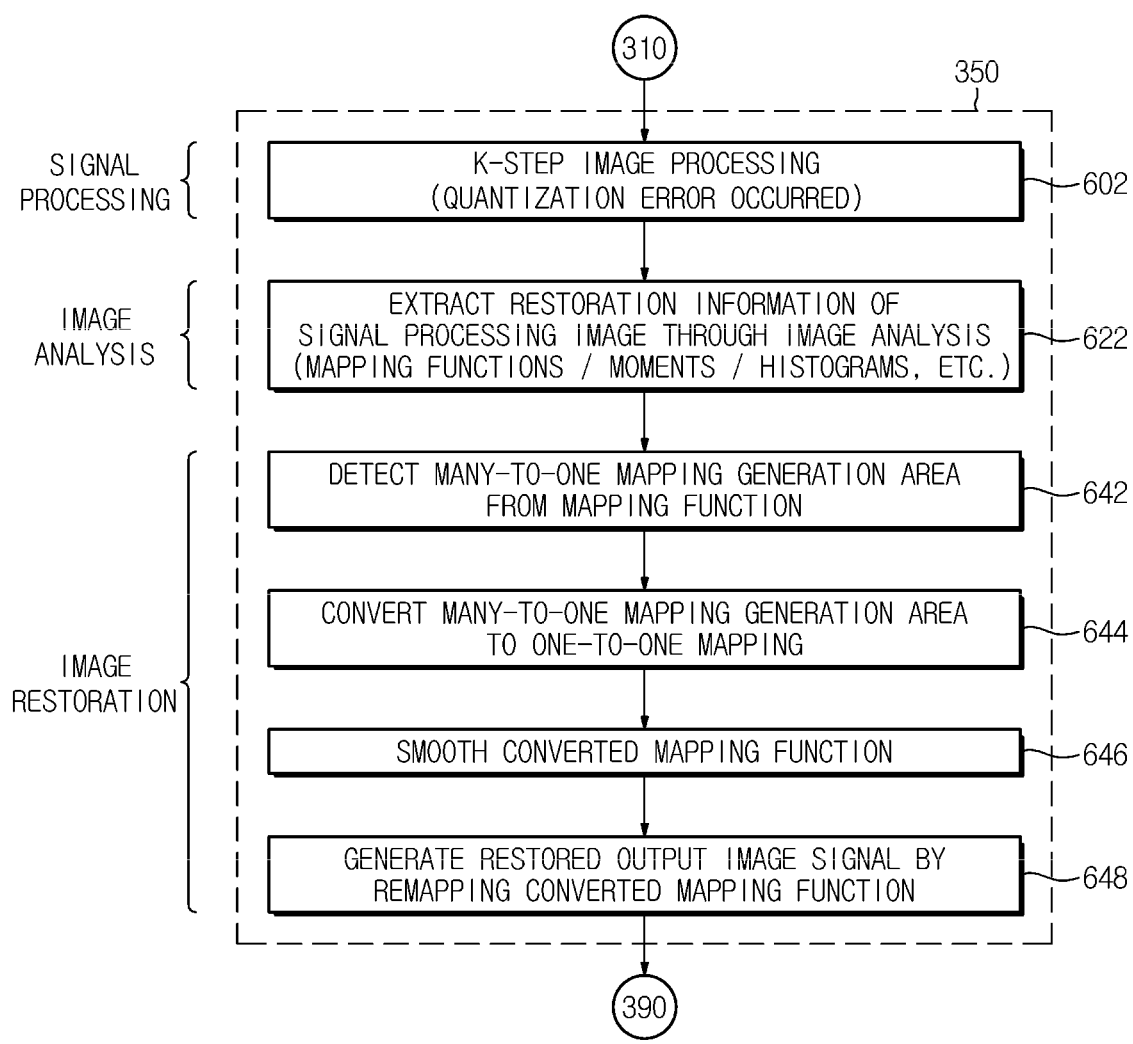
FIG. 6 is a view illustrating an image restoration method of an image display apparatus according to an embodiment.

FIG. 6 is a view illustrating an image restoration method of an image display apparatus according to an embodiment. In particular, FIG. 6 is a view particularly illustrating an image restoration method performed in the signal processing and restoration operation 350 of FIG. 3 described above. As illustrated in FIG. 6, the signal processing of the input image signal may be performed in operation 602, image analysis may be performed to extract the restoration information in operations 622 to 624, and the image restoration may be performed by restoring the quantization error with reference to the restoration information.

In the at least one signal processing block 402, the signal processing of the k-step may be performed on the received input image signal. During the signal processing of the k-step by the at least one signal processing block 402, image signal loss may occur due to the quantization error occurring in the quantization process. In an image analysis operation and an image restoration operation described below, a restoration operation may be performed to restore the quantization error.

The analysis logic 552 of the signal restoration block 450 may compare and analyze the image signal processed by the at least one signal processing block 402 and the original input image signal to extract the restoration information from the signal processing image (622). The restoration information may include the moments, histograms, mapping functions, etc., which can be obtained through comparison of the original input image signal and the signal processing image.

The moment of the signal-processed image signal may indicate statistical characteristics of the image, and include averages, variances, and standard deviations of the signal-processed image pixel values for pixels having the same value in the input image. Using the moment of the image signal, it is possible to identify whether a global, local, or random signal processing process is included in the signal processing block 402. In addition, unique signal processing characteristics of each of the global, local, or random signal processing processes may be analyzed.

The histogram illustrates the distribution of pixel values of the signal processed image for each signal value of the input image.

The mapping function may be obtained from a change in the pixel value of the original input image and the corresponding pixel value of the signal processing image. For example, when the signal processing is global over the entire area of the image and the change by the signal processing is deterministic (i.e., not random), the mapping function may be estimated based on which the pixel value each pixel of the original input image has changed by the signal processing.

Conversely, when the image processing process includes a random process such as dithering, it is possible to estimate the mapping function from the average of the changed pixel values of the corresponding pixels in the signal-processed image of pixels having the same pixel value in the input image signal. The mapping function may indicate a corresponding pixel value for each pixel. In the case of the image signal that has undergone the image signal processing including the random process, the mapping function may be estimated after removing a random element by obtaining the average of pixel values. When the signal processing is performed locally on a partial area of the image, the entire image may be divided into a plurality of areas and the mapping function may be estimated for each of the plurality of areas.

When the restoration information is extracted, by using the extracted signal processing image, the signal processing image may be restored close to the ideal image processing result without both quantization and errors. As a first operation of the image restoration, the many-to-one mapping generation area existing in the image may be detected from the mapping function included in the restoration information (642).

Figure 7:
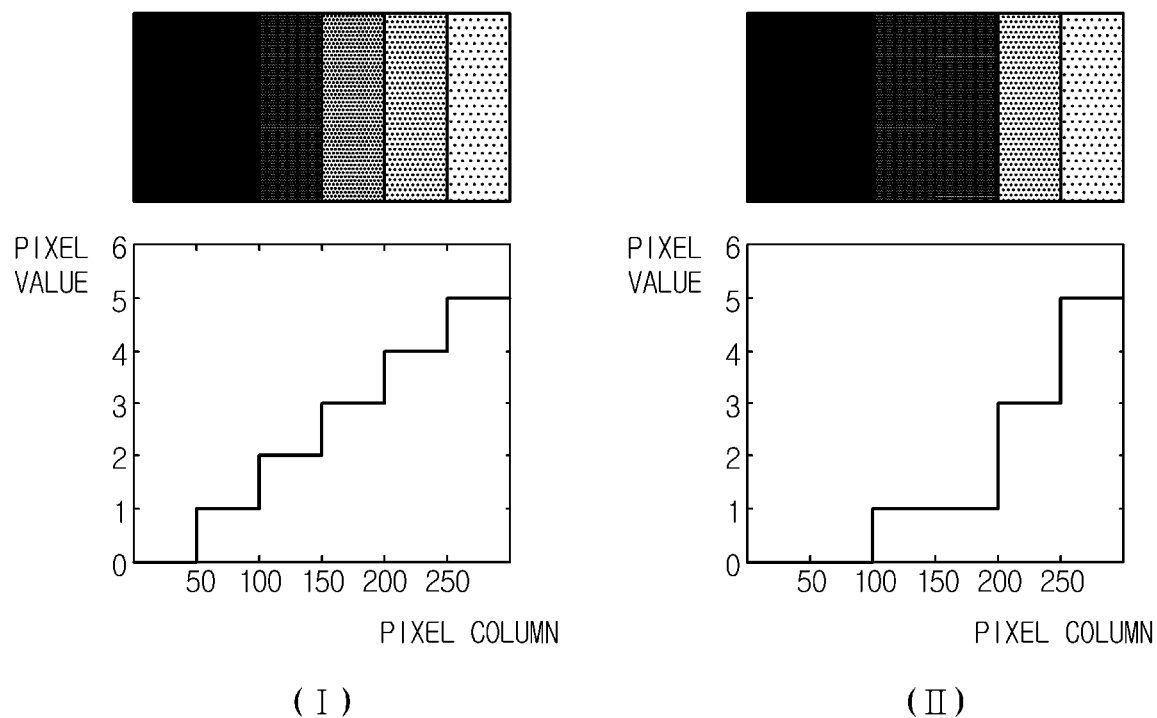
FIG. 7 is a view illustrating an example in which many-to-one mapping generates and some steps are lost in an integer process after an original input image passes an exponential transform curve in a signal processing block.

FIG. 7 is a view illustrating an example in which many-to-one mapping generates and some steps are lost in an integer process after an original input image passes an exponential transform curve in a signal processing block. In FIG. 7, an x-axis is a pixel column and a y-axis is a pixel value. FIG. 7I is the original input image and a cross-section of the x-axis. FIG. 7II is the signal processing image and a cross-section of the x-axis. In FIG. 7I, a gradation may be distinguished for every 50 pixel columns, but in FIG. 7II, it is difficult to distinguish 0-50 pixel columns and 51-100 pixel columns due to step loss that occurs during the image processing in the signal processing block 402. In addition, in FIG. 7II, 101-150 pixel columns and 151-200 pixel columns are also difficult to distinguish due to the step loss. In the image restoration according to the embodiment, it is intended to restore the loss of the image signal as illustrated in FIG. 7II. However, in the signal processing block 402, other types of signal processing may be performed in addition to an exponential conversion curve, and in the embodiment, the image signal may be restored for signal processing results other than the exponential conversion curve.

Referring back to FIG. 6, in the restoration logic 554, the many-to-one mapping generation area may be converted to the one-to-one mapping (644). In the restoration logic 554, various interpolation methods may be used to convert the many-to-one mapping generation area to the one-to-one mapping. As an embodiment of the interpolation method, a linear interpolation method (Linear Interpolation) may be used.

The linear interpolation method is an interpolation method using a straight line. This is a method of expressing given points in a straight line followed by a curved line. Given two points, a function $f(x)$ passing through two points is obtained by a linear equation. That is, when two points $(x_i, y_i)$ and $(x_{i+1}, y_{i+1})$ on a curved line of $y=f(x)$ are given, it is a method to find an approximate value $P(x)$ of $f(x)$ for any point x as a linear function of x connecting the two points $(x_i, y_i)$ and $(x_{i+1}, y_{i+1})$ in the straight line. The straight line connecting the two points may be expressed by Equation 1 below, and solving for y, $y=p(x)$ may be expressed as Equation 2 below.

$$\frac{y - y_i}{x - x_i} = \frac{y_{i+1} - y_i}{x_{i+1} - x_i} \qquad \text{(Equation 1)}$$

$$p(x) = \frac{y_i(x - x_{i+1}) - y_{i+1}(x - x_i)}{x_i - x_{i+1}} \qquad \text{(Equation 2)}$$

For example, in the case of an initial mapping function $f$, $f(1)=0$, but when the linear interpolation method is applied, $f(1)=(f(0)+f(2))/2=0.5$. In the linear interpolation method, the shorter the distance between points given as data, the better the approximation may be obtained.

Figure 8:
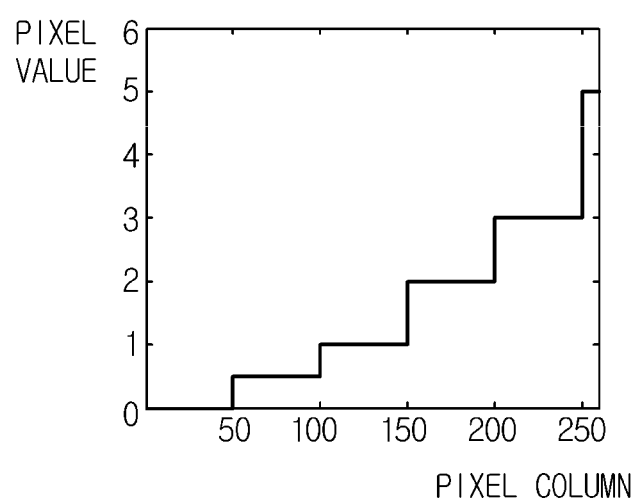
FIG. 8 is a view illustrating a result of converting a many-to-one mapping generation area to one-to-one mapping using a linear interpolation method.

FIG. 8 is a view illustrating a result of converting a many-to-one mapping generation area to one-to-one mapping using a linear interpolation method. In FIG. 7II, it has been illustrated that it is difficult to distinguish between the 0-100 pixel column section and the 101-200 pixel column section due to the step loss. In FIG. 8, the distinction between the 0-50 pixel columns, the 51-100 pixel columns, the 101-150 pixel columns, and the 151-200 pixel columns is clear by converting the many-to-one mapping generation area to the one-to-one mapping using the linear interpolation method. Comparing FIG. 7I, FIG. 7II, and FIG. 8 in turn, it can be seen that the step loss of the signal processing image is restored to a state close to the original input image signal.

Returning to FIG. 6 again, the restoration logic 554 may smooth the converted mapping function (646). The smoothing process is optional and may be omitted if necessary. In general, the mapping function of the image processing process has smooth characteristics. When the mapping function changes rapidly, a false contour may be generated in the image processing process. However, when the mapping function is obtained by using the image as the result of processing signals of various steps, it includes points that change rapidly due to quantization. Therefore, by smoothing the mapping function, it is possible to obtain the mapping function that is close to the ideal shape having the smooth characteristics while covering the entire signal processing process.

Various types of filters may be used as the filter for smoothing. Typical examples thereof include an average filter and a Gaussian filter. In the average filter, all pixels are given the same weight. In the Gaussian filter, the higher the weight toward a center of a mask, the more the weight is given to all pixels.

Figure 9:
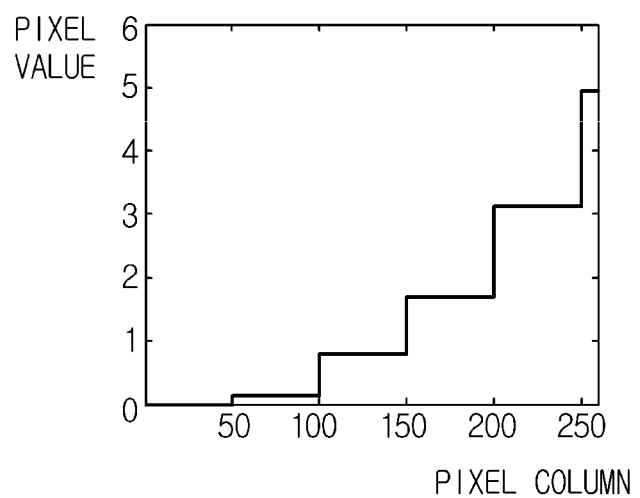
FIG. 9 is a view illustrating a result of applying smoothing to a mapping function in restoration logic according to an embodiment.

FIG. 9 is a view illustrating a result of applying smoothing to a mapping function in restoration logic according to an embodiment. In the restoration logic 554, the smoothing may be applied so that the converted one-to-one mapping obtained by applying the interpolation method for each many-to-one mapping generation area has a smooth shape as a whole.

Referring back to FIG. 6, the restoration logic 554 may generate the restored output image signal by remapping the converted mapping function with reference to the original input image signal (648).

Figure 10:
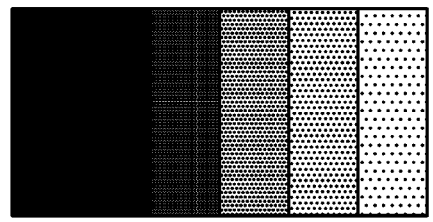
FIG. 10 is a view comparing a final image restoration result of a signal restoration block with an input image signal and a lost image signal according to an embodiment.
Figure 10:
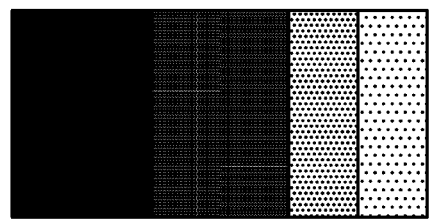
Figure 10:
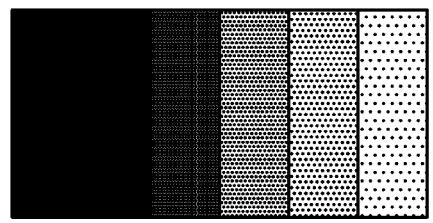

FIG. 10 is a view comparing a final image restoration result of a signal restoration block with an input image signal and a lost image signal according to an embodiment. FIG. 10I is the ideal output image signal using a floating point operation, FIG. 10II is the image signal in which the step loss occurs due to the quantization error, and FIG. 10III is the image signal restored according to the embodiment. As illustrated in FIG. 10, steps of image loss are restored through the restoration operation of the signal restoration block 450 according to the embodiment, whereby changes in pixels are restored close to an ideal case using the floating point.

Figure 11:
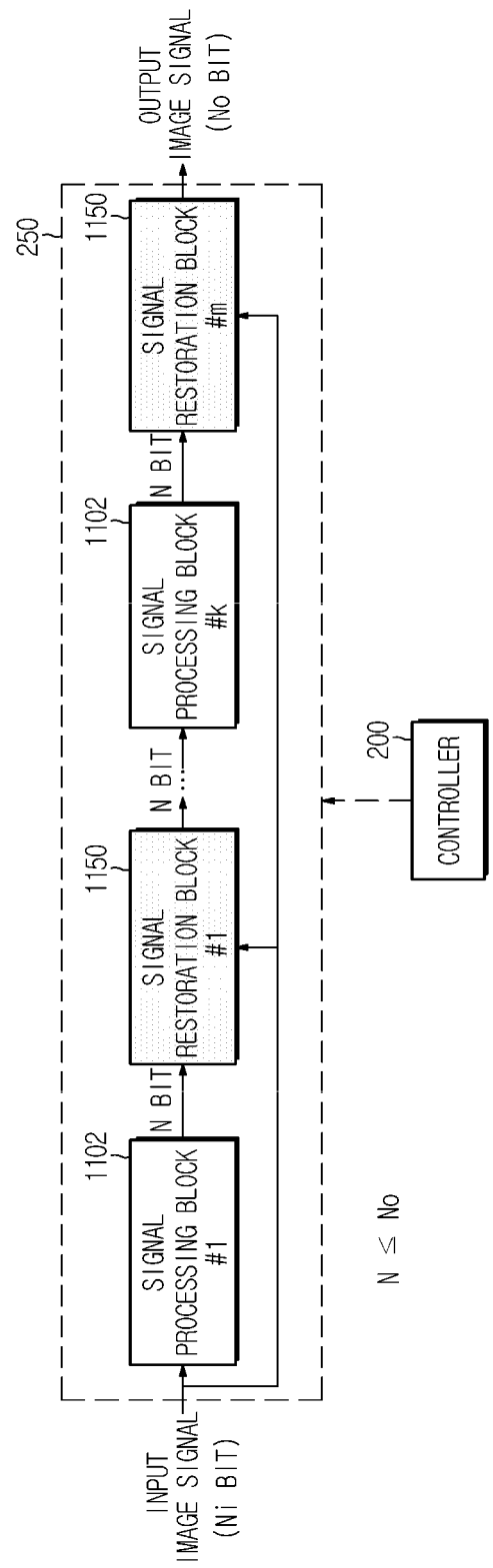
FIG. 11 is a view illustrating a configuration of an image signal processor of an image display apparatus according to another embodiment.

FIG. 11 is a view illustrating a configuration of an image signal processor of an image display apparatus according to another embodiment. The image signal processor 250 illustrated in FIG. 11 may be provided to perform the signal processing and restoration 350 previously described in FIG. 3. However, the image signal processor 250 of FIG. 11 may include a plurality of signal restoration blocks 1150.

As illustrated in FIG. 11, the image signal processor 250 may include a plurality of signal processing blocks 1102 and the plurality of signal restoration blocks 1150. The last signal restoration block 1150 among the plurality of signal restoration blocks 1150 may be located after the last signal processing block 1102. The remaining signal restoration block 1150 may be disposed in the middle of the plurality of signal processing blocks 1102 to perform the restoration operation on the image signal having a certain level of the image signal processing, and then restore the restored image signal to the next signal processing block 1102.

In FIG. 11, the original input image signal may be input to each of the plurality of signal restoration blocks 1150. That is, in each of the plurality of signal restoration blocks 1150, two signals of the image signal processed in the signal processing block 1102 of the previous stage and the original input image signal may be received as the input signals.

When a large number of steps are required for the image signal processing, as illustrated in FIG. 11, by disposing at least one (preferably multiple) of the signal restoration blocks 1150 in the middle of the image signal processing, it is possible to prevent image distortion due to the quantization error from becoming large to an un-restorable level.

In the image signal processor 250, for example, the N-bit image signal may be handled in the signal processing process until the input image signal is input to the signal restoration block 1150. The number of the N bits of the image signal handled in at least one of the signal processing blocks 1102 is not necessarily dependent on the number of the Ni bits of the input image signal and the number of the No bits of the output image signal. When processing signals in the at least one signal processing block 1102, the signal processing may be performed within a predetermined N-bit range without expanding the number of bits. The extension of the number of bits occurs only in the signal restoration block 1150. When there are multiple signal restoration blocks 1150, the number of bits is expanded only in the signal restoration block 1150 located at a last position in the signal flow. At this time, the number of the N bits of the image signal output from the signal processing block 1102 and the number of the No bits of the image signal output from the signal restoration block 1150 have a relationship of 'N≤No.' That is, the number of the No bits of the image signal output from the signal restoration block 1150 is greater than or equal to the number of the N bits of the image signal output from the signal processing block 1102.

As such, since the at least one signal processing block 1102 of the image signal processor 250 according to the embodiment does not increase the number of allocated bits, the burden of hardware and software that may be caused by the increase of the number of allocated bits may be reduced.

Figure 12:
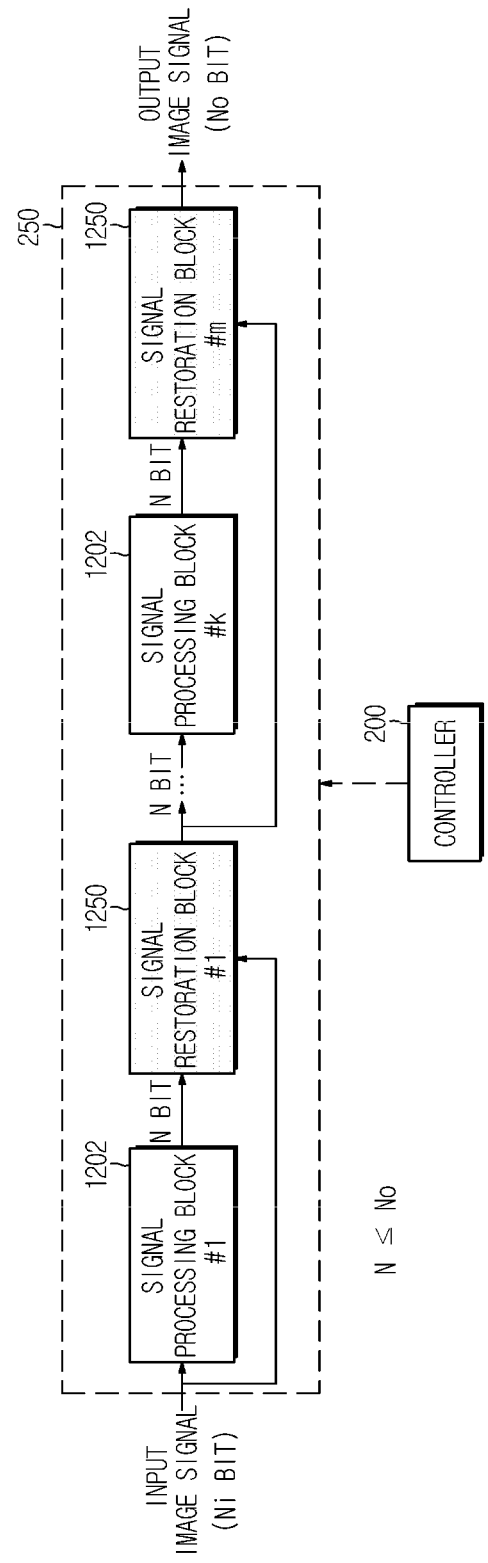
FIG. 12 is a view illustrating a configuration of an image signal processor of an image display apparatus according to another embodiment.

FIG. 12 is a view illustrating a configuration of an image signal processor of an image display apparatus according to another embodiment. The image signal processor 250 illustrated in FIG. 12 may be provided to perform the signal processing and restoration 350 previously described in FIG. 3. However, the image signal processor 250 of FIG. 12 may include the plurality of signal restoration blocks 1150.

As illustrated in FIG. 12, the image signal processor 250 may include a plurality of signal processing blocks 1202 and a plurality of signal restoration blocks 1250. The last signal restoration block 1250 among the plurality of signal restoration blocks 1250 may be located after the last signal processing block 1202. The remaining signal restoration block 1250 may be disposed in the middle of the plurality of signal processing blocks 1202 to perform the restoration operation on the image signal having a certain level of the image signal processing, and then restore the restored image signal to the next signal processing block 1202.

In FIG. 12, the original input image signal may be input only to the first signal restoration block (#1) 1250 among the plurality of signal restoration blocks 1250. The output image signal of the preceding signal restoration block may be input to the signal restoration block 1250 disposed after the second.

When a large number of steps are required for the image signal processing, as illustrated in FIG. 12, by disposing at least one (preferably multiple) of the signal restoration blocks 1250 in the middle of the image signal processing, it is possible to prevent image distortion due to the quantization error from becoming large to an un-restorable level. In particular, in a structure illustrated in FIG. 12, the output image signal of the preceding signal restoration block 1250 may be transmitted to the input of the signal restoration block 1250 disposed in the next stage, thereby increasing the efficiency of hardware or software.

In the image signal processor 250, for example, the N-bit image signal may be handled in the signal processing process until the input image signal is input to the signal restoration block 1250. The number of the N bits of the image signal handled in at least one of the signal processing blocks 1202 is not necessarily dependent on the number of the Ni bits of the input image signal and the number of the No bits of the output image signal. When processing signals in the at least one signal processing block 1202, the signal processing may be performed within a predetermined N-bit range without expanding the number of bits. The extension of the number of bits occurs only in the signal restoration block 1250. When there are multiple signal restoration blocks 1250, the number of bits is expanded only in the signal restoration block (#m) 1250 located at a last position in the signal flow. At this time, the number of the N bits of the image signal output from the signal processing block 1202 and the number of the No bits of the image signal output from the signal restoration block 1250 have a relationship of 'N≤No.' That is, the number of the No bits of the image signal output from the signal restoration block 1250 is greater than or equal to the number of the N bits of the image signal output from the signal processing block 1202.

As such, since the at least one signal processing block 1202 of the image signal processor 250 according to the embodiment does not increase the number of allocated bits, the burden of hardware and software that may be caused by the increase of the number of allocated bits may be reduced.

The disclosed embodiments are merely illustrative, and those skilled in the art will appreciate that various modifications, changes, and substitutions may be made without departing from the essential characteristics thereof. Therefore, the exemplary embodiments disclosed above and the accompanying drawings are not intended to limit the technical idea, but to describe the technical spirit, and the scope of the technical idea is not limited by the embodiments and the accompanying drawings. The scope of protection shall be interpreted by the following claims, and all technical ideas within the scope of equivalents shall be interpreted as being included in the scope of rights.

The invention claimed is:

1. An image display apparatus comprising:
   an image signal processor configured to receive an input image signal and to:
      perform image processing of the input image signal to provide a processed image signal,
      identify a type of the image processing by comparing the input image signal and the processed image signal,
      obtain restoration information from the processed image signal and the input image signal based on the identified image processing type, the restoration information corresponding to a loss that occurs in the image processing, and
      remap the processed image signal using the restoration information to compensate for errors in the processed image signal; and
   a display configured to output the remapped processed image signal,
      wherein the image signal processor is configured to:
         identify an area in which a many-to-one mapping is performed based on the comparing of the input image signal and the processed image signal, and
         perform a linear interpolation in the area to compensate a loss that occurs in the many-to-one mapping.

2. The image display apparatus according to claim 1, wherein the image signal processor comprises:
   at least one signal processing block configured to perform the image processing; and
   at least one signal restoration block configured to obtain the restoration information extraction and to remap the processed image signal using the restoration information.

3. The image display apparatus according to claim 2, wherein, in the signal processing block, the number of bits of the processed image signal is not expanded, and
   wherein, in the signal restoration block, the number of bits of the processed image signal is extended.

4. The image display apparatus according to claim 2, wherein an extension of the number of bits of the image signal in the signal restoration block is greater than or equal to the number of bits of the remapped processed image signal of the signal restoration block than the number of bits of the processed image signal output from the signal processing block.

5. The image display apparatus according to claim 2, wherein the signal restoration block comprises:
   analysis logic configured to extract the restoration information through analysis of the input image signal and the processed image signal; and
   restoration logic configured to remap the processed image signal based on the restoration information.

6. The image display apparatus according to claim 1, wherein the image signal processor is configured to identify the image processing type using average, variance, and standard deviation of image pixel values processed for pixels having the same value in the input image, and
   wherein the image processing type comprises at least one of global processing, local processing, and random processing.

7. The image display apparatus according to claim 6, wherein, when the image processing type is the global processing, the image signal processor is configured to estimate a mapping function from a certain pixel value changed by the signal processing for each pixel of the input image signal.

8. The image display apparatus according to claim 6, wherein, when the image processing type is the random processing, the image signal processor is configured to estimate a mapping function from the average of changed pixel values of corresponding pixels in an image in which pixels having the same pixel value in the input image signal are processed.

9. The image display apparatus according to claim 6, wherein, when the image processing type is the random processing, the image signal processor is configured to divide the input image into a plurality of areas and estimate a mapping function for each of the plurality of areas.

10. The image display apparatus according to claim 1, wherein the restoration information comprises a mapping function of the input image signal.

11. The image display apparatus according to claim 1, wherein the remapping of the processed image signal using the restoration information is configured to smooth a mapping function converted to one-to-one mapping, and to generate a restored output image signal by remapping the converted mapping function with reference to the input image signal.

12. The image display apparatus according to claim 1, wherein the errors are quantization errors that occur during a quantization process of the input image signal.

13. A method of controlling an image display apparatus comprising:
   receiving an input image signal;

performing image processing of the input image signal to provide a processed image signal;

identifying a type of image processing by comparing the input image signal and the processed image signal;

obtaining restoration information from the processed image signal and the input image signal based on the identified image processing type, the restoration information corresponding to a loss that occurs in the image processing, remapping the processed image signal using the restoration information to compensate for errors in the processed image signal; and outputting the remapped processed image signal, wherein the remapping the processed image signal comprises:

identifying an area in which a many-to-one mapping is performed based on the comparing of the input image signal and the processed image signal, and performing a linear interpolation in the area to compensate a loss that occurs in the many-to-one mapping.

14. The method according to claim 13, wherein, in the performing image processing, the number of bits of the processed image signal is not expanded, and wherein, in the obtaining restoration information, the number of bits of the remapped processed image signal is extended.

15. The method according to claim 13, wherein an extension of the number of bits of the remapped processed image signal including the obtained restoration information is greater than or equal to the number of bits of the processed image signal.

16. The method according to claim 13, wherein the identifying comprises:

analyzing the input image signal and the processed image signal; and restoring the processed image signal using the restoration information.

17. The method according to claim 13, further comprising:

identifying the image processing type using average, variance, and standard deviation of image pixel values processed for pixels having the same value in the input image, wherein the image processing type comprises at least one of global processing, local processing, and random processing.

18. The method according to claim 17, wherein, when the signal processing type is the global processing, estimating a mapping function from a certain pixel value changed by the signal processing for each pixel of the input image signal.

19. The method according to claim 17, wherein, when the signal processing type is the random processing, estimating a mapping function from the average of changed pixel values of corresponding pixels in an image in which pixels having the same pixel value in the input image signal are processed.

20. The method according to claim 17, wherein, when the signal processing type is the random processing, dividing the input image into a plurality of areas and estimate a mapping function for each of the plurality of areas.

21. The method according to claim 13, wherein the restoration information comprises a mapping function of the input image signal.

22. The method according to claim 13, wherein the remapping further comprises:

smoothing a mapping function converted to one-to-one mapping; and generating the remapped processed image signal by remapping the converted mapping function with reference to the input image signal.

23. The method according to claim 13, wherein the errors are quantization errors that occur during a quantization process of the input image signal.

* * * * *